Patented Jan. 9, 1951

2,537,868

UNITED STATES PATENT OFFICE 2,537,868

WATER-SOLUBLE SALTS OF DIETHYL-STILBESTROL DI-(SULFOACETATE) AND PROCESS FOR THE MANUFACTURE THEREOF

René Urban, Basel, Switzerland, assignor to Hoffmann-La Roche Inc., Nutley, N. J., a corporation of New Jersey No Drawing. Application January 17, 1950, Serial No. 139,126. In Switzerland February 4, 1949

8 Claims. (Cl. 260—297)

Diethylstilboestrol is practically insoluble in water and hardly soluble in most other solvents. For the parenteral administration of diethylstilboestrol, oily solutions of its fatty acid esters, such as for instance the dipropionate or the dipalmitate, are usually employed. Diethylstilboestrol may also be injected in the form of a suspension in water. In both cases only intramuscular injections are feasible.

For the purpose of obtaining a strong and rapid action by intravenous injections, it is essential that the compound used be well soluble in water.

Now I have found, according to the present invention, that the salts of diethylstilboestrol di-(sulfoacetate) are particularly well soluble in water and show the full oestrogenic activity of diethylstilboestrol.

I have further found a process for the manufacture of said salts, which comprises reacting diethylstilboestrol with sulfoacetylchloride in the presence of pyridine and treating the reaction product with a base. Examples of bases which form salts comprised within the scope of the invention are the following: alkali metal bases, such as sodium hydroxide, potassium hydroxide, sodium methylate, potassium ethylate; organic bases, such as pyridine, piperidine, dimethylaniline, ethylaniline, morpholine and the like.

The reaction of the starting materials in pyridine may be illustrated as follows:

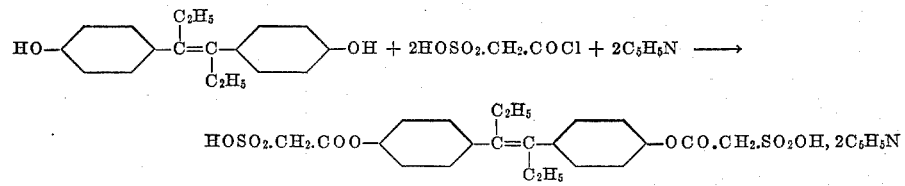

The dipyridinium salt forms yellowish crystals which melt with decomposition at 223–225° C. The disodium salt of the ester, which is suitably prepared from the dipyridinium salt by treating the latter with sodium hydroxide or sodium alcoholate, forms colourless, shiny and slight hygroscopic crystals which melt wih decomposition at 228–230° C. The aqueous solution of this salt has a pH of 6.6.

The salts obtained according to the invention show the full oestrogenic activity of diethylstilboestrol and are characterized by their relatively low toxicity and their high solubility in water; thus, for instance, the disodium salt of diethylstilboestrol di-(sulfoacetate) dissolves in water to an extent of more than 20 per cent., and intravenous injections even of high doses thereof, are well tolerated without any irritation or pains.

Example 1

12 parts by weight of diethylstilboestrol are dissolved in 80 parts by weight of pyridine. To this solution 19 parts by weight of sulfoacetylchloride are added in portions, while stirring. Complete solution is achieved. The temperature increases to 80–90° C. The mixture is stirred until it is cooled down to room temperature. The dipyridinium salt of diethylstilboestrol di-(sulfoacetate) separates in the form of crystals. It is separated from the solution, washed with a little pyridine and finally dried. There are obtained 25 parts by weight of raw dipyridinium salt. For purification purposes, this salt is recrystallized from glacial acetic acid or from methanol/ether. In a pure state, this salt forms yellowish crystals which melt with decomposition at 223–225° C. The solubility of the dipyridinium salt in water is 1.5 per cent., the solution being slightly acidic (pH=4). The salt is soluble in acid and alkaline mediums, but in alkaline mediums it is saponified rapidly.

Example 2

44 parts by weight of the dipyridinium salt of diethylstilboestrol di-(sulfoacetate) are dissolved in 1300 parts by weight of methanol and to this solution is added a solution of sodium methylate prepared from 3 parts by weight of sodium and 200 parts by weight of methanol. The disodium salt of diethylstilboestrol di-(sulfoacetate) precipitates from the solution after the addition of 7000 parts by weight of ether. The salt is separated, washed with ether and dried. The yield is 26 parts by weight of a raw product. The purification is achieved by recrystallization either from alcohol/ether or from water/acetone. The purified salt is dried in a vacuo desiccator at 100° C. until its weight remains constant. In a pure state, the disodium salt forms colourless, shiny crystals which are somewhat hygroscopic. It is easily soluble in water and yields clear, practically neutral solutions (pH=6.6) of a concentration of up to 20 per cent. The disodium salt can also be obtained by mixing 67 parts by weight of dipyridinium salt of diethylstilboestrol di-(sulfoacetate) with 670 parts by weight of water and by dropwise adding thereto a solution of 8 parts by weight of sodium hydroxide in 60 parts by weight of water at such a rate as to prevent the pH of the solution from increasing beyond 6. Then 10 parts by weight of charcoal are added and the mixture is agitated for a further half an hour. The solution is filtered and the filtrate evaporated to dryness in vacuo at about 50° C. The remaining disodium salt is purified by recrystallisation as indicated above.

I claim:

1. A compound of the group consisting of diethylstilboestrol di-(sulfoacetate) and its water-soluble salts.
2. Diethylstilboestrol di-(sulfoacetate).
3. An alkali metal salt of diethylstilboestrol di-(sulfoacetate).
4. The disodium salt of diethylstilboestrol di-(sulfoacetate).
5. A salt of diethylstilboestrol di-(sulfoacetate) with an organic base.
6. The dipyridinium salt of diethylstilboestrol di-(sulfoacetate).
7. A process comprising reacting diethylstilboestrol with sulfoacetylchloride in the presence of pyridine and treating the reaction product with a base to produce a salt of diethylstilboestrol di-(sulfoacetate) with said base.
8. The process of claim 7 wherein the base is sodium hydroxide and the salt obtained is the disodium salt of diethylstilboestrol di-(sulfoacetate).

RENÉ URBAN.

No references cited.